US011510171B2

(12) United States Patent
Seiho (10) Patent No.: US 11,510,171 B2
(45) Date of Patent: Nov. 22, 2022

(54) APPARATUS AND METHOD FOR POSITION ESTIMATION

(71) Applicant: ALLIED TELESIS HOLDINGS K.K., Tokyo (JP)

(72) Inventor: Itano Seiho, Tokyo (JP)

(73) Assignee: ALLIED TELESIS HOLDINGS K.K., Tokyo (JP)

(*) Notice: Subject to any disclaimer, the term of this patent is extended or adjusted under 35 U.S.C. 154(b) by 260 days.

(21) Appl. No.: 16/909,249

(22) Filed: Jun. 23, 2020

(65) Prior Publication Data

US 2020/0404611 A1 Dec. 24, 2020

(30) Foreign Application Priority Data

Jun. 24, 2019 (JP) .............................. JP2019-116227

(51) Int. Cl.
*H04W 64/00* (2009.01)
*H04W 4/02* (2018.01)
*G01S 5/02* (2010.01)
*G01S 5/14* (2006.01)

(52) U.S. Cl.
CPC ......... *H04W 64/003* (2013.01); *G01S 5/0252* (2013.01); *G01S 5/14* (2013.01); *H04W 4/023* (2013.01)

(58) Field of Classification Search
CPC ... H04W 64/003; H04W 4/023; G01S 5/0252; G01S 5/14
See application file for complete search history.

(56) References Cited

U.S. PATENT DOCUMENTS

2017/0356979 A1* 12/2017 Georgiou .............. G01S 5/0215

FOREIGN PATENT DOCUMENTS

| CN | 105137393 | * 12/2015 | ............... G01S 5/12 |
| JP | 2017223645 A | 12/2017 | |

* cited by examiner

*Primary Examiner* — Muthuswamy G Manoharan
(74) *Attorney, Agent, or Firm* — Concept IP LLP; Michael Zarrabian (57) ABSTRACT

A position estimation apparatus estimates the position of a radio communication device that outputs a signal, where the apparatus includes a distance estimating section, a difference summing section, and a minimum difference candidate point determining section, where the distance estimating section estimates actual distances between wireless access points that receive the signal and the radio communication device as estimated distances based on the reception strength of the signal, where the difference summing section sums values based on differences between the distances between candidate points for the position of the radio communication device and the wireless access points and the estimated distances, where the minimum difference candidate point determining section determines a minimum difference candidate point, and where the position of the minimum difference candidate point is estimated as the position of the radio communication device.

6 Claims, 10 Drawing Sheets

APPARATUS AND METHOD FOR POSITION ESTIMATION

CROSS-REFERENCE TO RELATED APPLICATIONS

This application claims priority under 35 U.S.C. § 119 to Japanese Application No. 2019-116227, filed Jun. 24, 2019, the contents of which are hereby incorporated by reference herein for all purposes.

TECHNICAL FIELD

Embodiments relate generally to position estimation, and more particularly to position estimation for a radio device.

BACKGROUND

There has conventionally been known estimating the position of a radio device for radio communications based on the distances between the radio device and three or more wireless access points (see Japanese Patent Application Publication No. 2017-223645, for example). The trilateration and the spring model, for example, have been known as position estimation methods for a radio device.

SUMMARY

It is however difficult to increase the accuracy of estimation of the distances between the radio device and the access points, though the estimation itself may be provided. The position of a radio device, if tried to be estimated, may not even be estimated when a low-accuracy distance estimate is used to perform the trilateration or the spring model.

It is hence an object of the present invention to allow for position estimation for a radio device as successfully as possible.

According to the present invention, a position estimation apparatus for estimation of the position of a radio communication device that outputs a signal, includes: a distance estimating section that estimates actual distances between wireless access points that receive the signal and the radio communication device as estimated distances based on the reception strength of the signal; a difference summing section that sums, for the wireless access points that received the signal, values based on differences between the distances between candidate points for the position of the radio communication device and the wireless access points and the estimated distances; and a minimum difference candidate point determining section that determines a minimum difference candidate point with a minimum value as a result of summation by the difference summing section among the candidate points, wherein the position of the minimum difference candidate point is estimated as the position of the radio communication device, and the candidate points exist within the area of a square that is circumscribed around a circle centered at one of the wireless access points with the maximum reception strength and having one of the estimated distances estimated for the center of the circle as a radius.

The thus constructed position estimation apparatus estimates the position of a radio communication device that outputs a signal. A distance estimating section estimates actual distances between wireless access points that receive the signal and the radio communication device as estimated distances based on the reception strength of the signal. A difference summing section sums, for the wireless access points that received the signal, values based on differences between the distances between candidate points for the position of the radio communication device and the wireless access points and the estimated distances. A minimum difference candidate point determining section determines a minimum difference candidate point with a minimum value as a result of summation by the difference summing section among the candidate points. The position of the minimum difference candidate point is estimated as the position of the radio communication device. The candidate points exist within the area of a square that is circumscribed around a circle centered at one of the wireless access points with the maximum reception strength and having one of the estimated distances estimated for the center of the circle as a radius.

According to the position estimation apparatus of the present invention, the difference summing section may be arranged to sum for the wireless access points that received the signal except for that with the maximum reception strength.

According to the position estimation apparatus of the present invention, the candidate points may be arranged at predetermined intervals.

According to the position estimation apparatus of the present invention, the difference summing section may be further arranged to sum, for the wireless access points that received the signal, values based on differences between the distances between surrounding points that surround the candidate points and the wireless access points and the estimated distances.

According to the position estimation apparatus of the present invention, the candidate points may be arranged at predetermined intervals, and the surrounding points may be arranged at intervals smaller than the predetermined intervals.

According to the position estimation apparatus of the present invention, the candidate points may exist within an area with the vertical sides and the horizontal sides of the square each extended by an error predicted between the estimated distances and the actual distances.

According to the position estimation apparatus of the present invention, the candidate points may exist within an area with the vertical sides and the horizontal sides of the square each extended by 2 meters.

According to the present invention, a position estimation method for estimating the position of a radio communication device that outputs a signal, includes: estimating actual distances between wireless access points that receive the signal and the radio communication device as estimated distances based on the reception strength of the signal; summing, for the wireless access points that received the signal, values based on differences between the distances between candidate points for the position of the radio communication device and the wireless access points and the estimated distances; and determining a minimum difference candidate point with a minimum value as a result of summation by the summing among the candidate points, wherein the position of the minimum difference candidate point is estimated as the position of the radio communication device, and the candidate points exist within the area of a square that is circumscribed around a circle centered at one of the wireless access points with the maximum reception strength and having one of the estimated distances estimated for the center of the circle as a radius.

BRIEF DESCRIPTION OF THE DRAWINGS

The components in the figures are not necessarily to scale, emphasis instead being placed upon illustrating the principals of the invention. Like reference numerals designate corresponding parts throughout the different views. Embodiments are illustrated by way of example and not limitation in the figures of the accompanying drawings, in which.

DETAILED DESCRIPTION

Preferred embodiments of the present invention will hereinafter be described with reference to the accompanying drawings.

Figure 1:
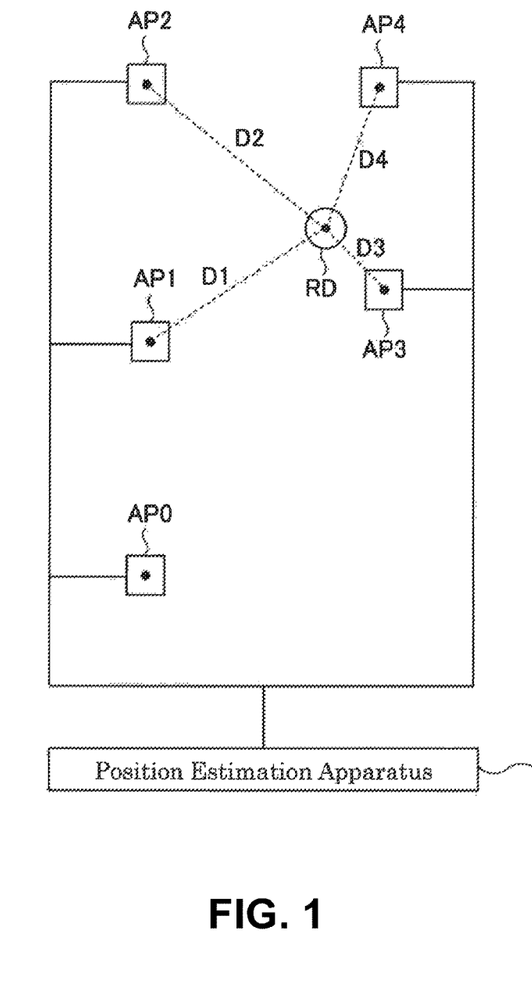
FIG. 1 outlines an example of the arrangement of wireless LAN access points AP0 to AP4 and a radio device (radio communication device) RD according to an embodiment of the present invention.

FIG. 1 outlines an example of the arrangement of wireless LAN access points AP0 to AP4 and a radio device (radio communication device) RD according to an embodiment of the present invention.

The radio device (radio communication device) RD is intended to wirelessly output a signal and is, for example, a CR (Convenience Radio), but without being limited thereto, may be a personal computer having a radio communication feature or a wireless LAN access point (other than AP0 to AP4).

The wireless LAN access points AP0, AP1, AP2, AP3, and AP4 (AP0 to AP4) are access points that receive a signal from the radio device RD. In some cases, the wireless LAN access points will hereinafter be referred to simply as access points. Note here that in the arrangement example shown in FIG. 1, the access point AP0 is too far from the radio device RD to receive a signal from the radio device RD.

The access point AP1 is arranged to measure the reception strength RSSI1 of a signal transmitted from the radio communication device RD. The access point AP2 is arranged to measure the reception strength RSSI2 of a signal transmitted from the radio communication device RD. The access point AP3 is arranged to measure the reception strength RSSI3 of a signal transmitted from the radio communication device RD. The access point AP4 is arranged to measure the reception strength RSSI4 of a signal transmitted from the radio communication device RD. It is noted that the reception strengths RSSI1 to RSSI4 each mean RSSI (i.e. Received Signal Strength Indicator).

The actual distance D1 is a distance between the access point AP1 and the radio communication device RD. The actual distance D2 is a distance between the access point AP2 and the radio communication device RD. The actual distance D3 is a distance between the access point AP3 and the radio communication device RD. The actual distance D4 is a distance between the access point AP4 and the radio communication device RD. The actual distance D3 is shortest among the actual distances D1, D2, D3, and D4.

The position estimation apparatus 1 is arranged to estimate the position of the radio communication device RD. The position estimation apparatus 1 is in wired connection (by, for example, a communication cable) with the access points AP0 to AP4. The position estimation apparatus 1 is arranged to receive reception strengths RSSI1 to RSSI4 from the access points AP1 to AP4.

It is noted that the embodiment of the present invention is based on the premise that the position estimation apparatus 1 is in wired connection with the access points AP0 to AP4. However, the position estimation apparatus 1 may be implemented in any one of the access points AP0 to AP4. In this case, the access point in which the position estimation apparatus 1 is implemented is arranged to wirelessly receive measurement results of the reception strengths from the other access points.

Figure 2:
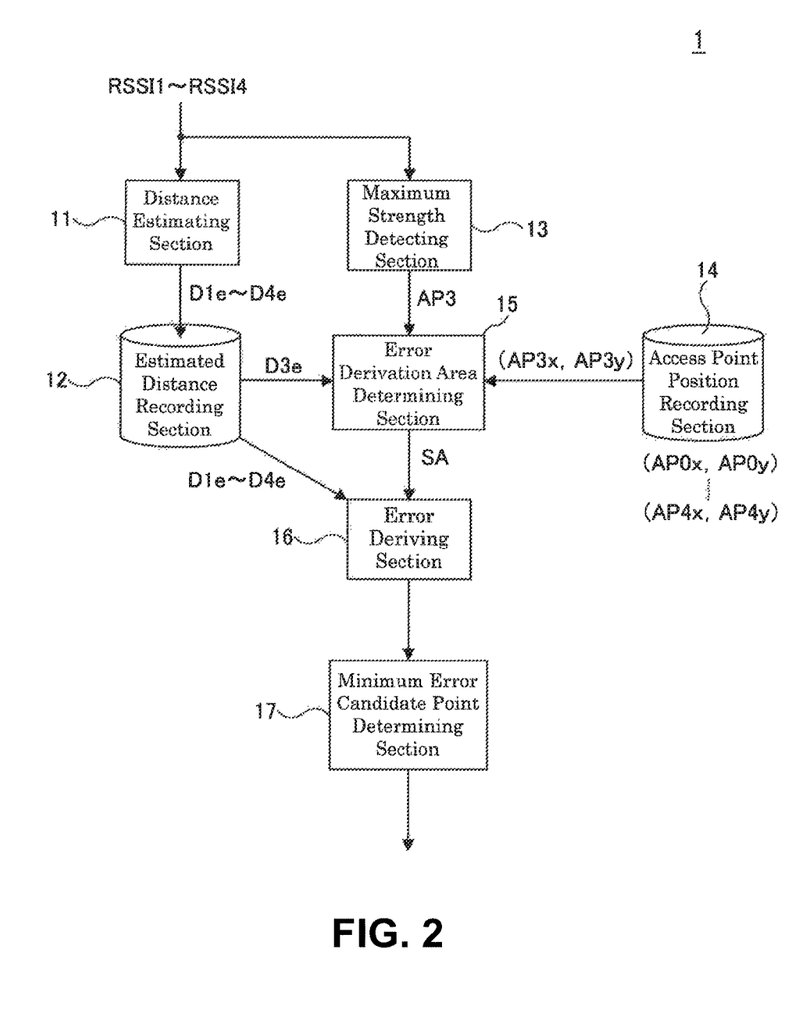
FIG. 2 is a functional block diagram showing the configuration of the position estimation apparatus 1 according to the embodiment of the present invention.

FIG. 2 is a functional block diagram showing the configuration of the position estimation apparatus 1 according to the embodiment of the present invention. The position estimation apparatus 1 according to the embodiment of the present invention includes a distance estimating section 11, an estimated distance recording section 12, a maximum strength detecting section 13, an access point position recording section 14, an error derivation area determining section 15, an error deriving section (difference summing section) 16, and a minimum error candidate point determining section (minimum difference candidate point determining section) 17.

The distance estimating section 11 is arranged to estimate the actual distances D1 to D4 between the access points AP1 to AP4 that receive a signal and the radio communication device RD as estimated distances D1$e$ to D4$e$ based on the reception strengths RSSI1 to RSSI4 of the signal. It is noted that the distance estimating section 11 is arranged to receive the reception strengths RSSI1 to RSSI4 from the access points AP1 to AP4.

The estimated distance D$i$e (where "i" represents an integer of 1 to 4) is estimated by the following formula (1), $$\text{Estimated Distance } Die\ [m] = 10^{\frac{Txp - RSSI - 20\log_{10}\frac{4\pi}{\lambda}}{10pf}} \quad (1)$$

where Txp represents a transmission power [dBm] of the radio communication device RD, pf represents a propagation factor (non-dimensional) in the vicinity of each access point, RSSI represents RSSI1 to RSSI4 [dBm], and λ represents a wavelength [m] of the signal transmitted from the radio communication device RD. A propagation factor in the vicinity of each access point AP$i$ and RSSI$i$ are assigned to the formula (1) to obtain the estimated distance D$i$e. For example, a propagation factor in the vicinity of the access point AP3 is assigned to pf in the formula (1) and RSSI3 is assigned to RSSI in the formula (1) to obtain the estimated distance D3$e$.

The estimated distance recording section 12 is arranged to receive and record, from the distance estimating section 11, the estimated distances D1$e$ to D4$e$ estimated in the distance estimating section 11.

The maximum strength detecting section 13 is arranged to receive the reception strengths RSSI1 to RSSI4 from the access points AP1 to AP4 to detect the maximum reception strength and output the access point where the maximum reception strength is measured (AP3 in the example of FIG. 1).

The access point position recording section 14 is arranged to record the positions of the access points AP0 to AP4. For example, the access point position recording section 14 is arranged to record the x coordinate and the y coordinate (AP0x, AP0y) to (AP4x, AP4y) of the access points AP0 to AP4.

The error derivation area determining section 15 is arranged to determine an area SA. In the area SA, candidate points P exist that are candidate positions of the radio communication device RD. The area SA in which the candidate points P exist is called error derivation area because the error deriving section 16 is arranged to derive errors (to be described hereinafter) for the candidate points P. The error derivation area determining section 15 is therefore arranged to determine an error derivation area (area SA).

Figure 3:
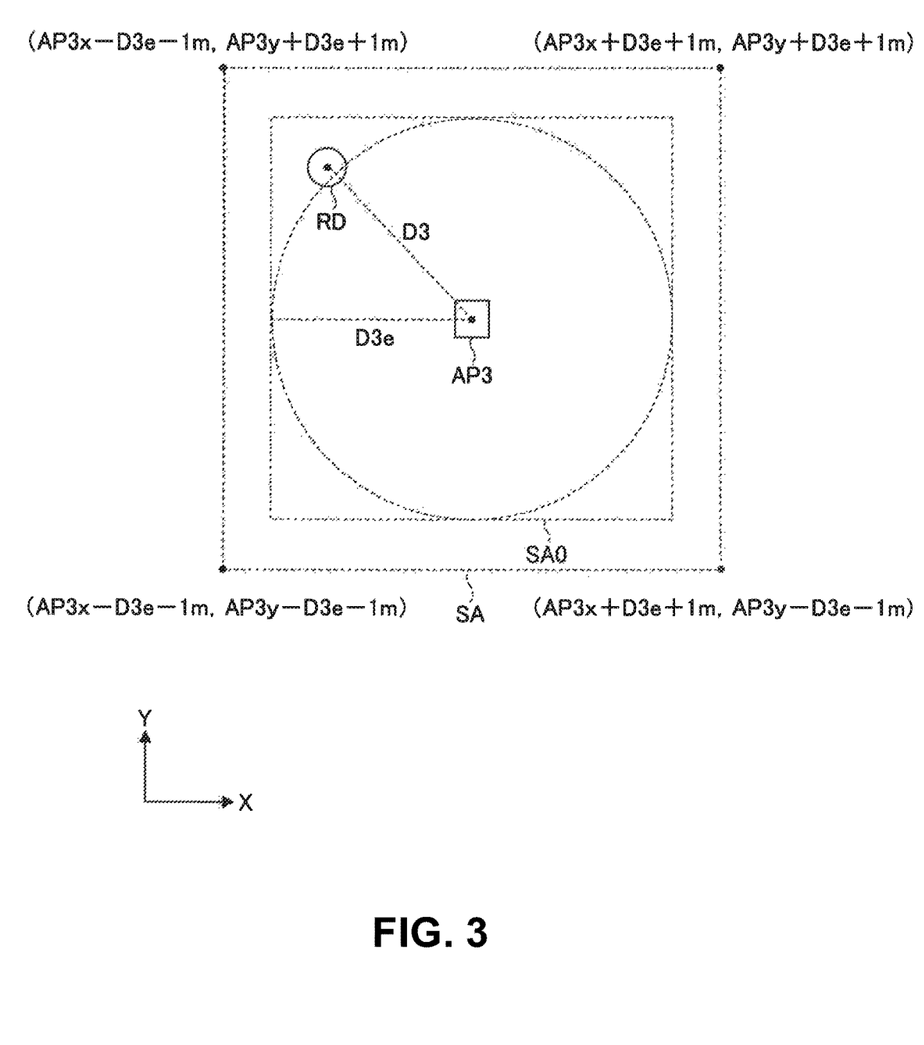
FIG. 3 illustrates an area SA in which the candidate points P exist, and an area SA0.

FIG. 3 illustrates an area SA in which the candidate points P exist, and an area SA0.

The area SA0 has a square shape circumscribed around a circle centered at the wireless access point AP3 with the maximum reception strength and having one D3e of the estimated distances estimated for the center (access point AP3) of the circle as a radius. It is noted that the estimated distance D3e may be slightly different from the actual distance D3. In the example of FIG. 3, the estimated distance D3e is slightly (by less than 1 m) shorter than the actual distance D3.

The area SA (error derivation area) is a result of extension of the vertical sides and the horizontal sides of the area SA0 by 2 meters. More particularly, the area SA is a result of vertical extension of each vertical side of the area SA0 by 1 meter and horizontal extension of each horizontal side of the area SA0 by 1 meter. The candidate points P exist within the area SA.

When the vertical direction is defined as X axis and the horizontal direction is defined as Y axis in FIG. 3, the area SA is a result of extension of the area SA0 by ±1 m in the X-axis direction and ±1 m in the Y-axis direction.

The 1 meter corresponds to the error predicted between the estimated distances D1e to D4e and the actual distances D1 to D4.

It can therefore be said that the area SA (error derivation area) is a result of extension of the vertical sides and the horizontal sides of the area SA0 by the error (±1 m) predicted between the estimated distances D1e to D4e and the actual distances D1 to D4 (in some cases, this will hereinafter be referred to as predicted error).

It is noted that in FIG. 3, the corners of the area SA0 have coordinates (AP3x+D3e, AP3y+D3e), (AP3x+D3e, AP3y−D3e), (AP3x−D3e, AP3y+D3e), and (AP3x−D3e, AP3y−D3e). The corners of the area SA have coordinates (AP3x+D3e+1 m, AP3y+D3e+1 m), (AP3x+D3e+1 m, AP3y−D3e−1 m), (AP3x−D3e−1 m, AP3y+D3e+1 m), and (AP3x−D3e−1 m, AP3y−D3e−1 m).

Alternatively, the predicted error may be defined by a proportion to the vertical side and the horizontal side of the area SA0. For example, the predicted error may be ±0.05 times the vertical side and the horizontal side of the area SA0. That is, when the vertical direction is defined as X axis and the horizontal direction is defined as Y axis in FIG. 3, the area SA may be a result of extension of the area SA0 by ±0.05 times the vertical side in the X-axis direction and ±0.05 times the horizontal side in the Y-axis direction. In this case, each side of the area SA is a result of 1.1 times each side of the area SA0.

Figure 4:
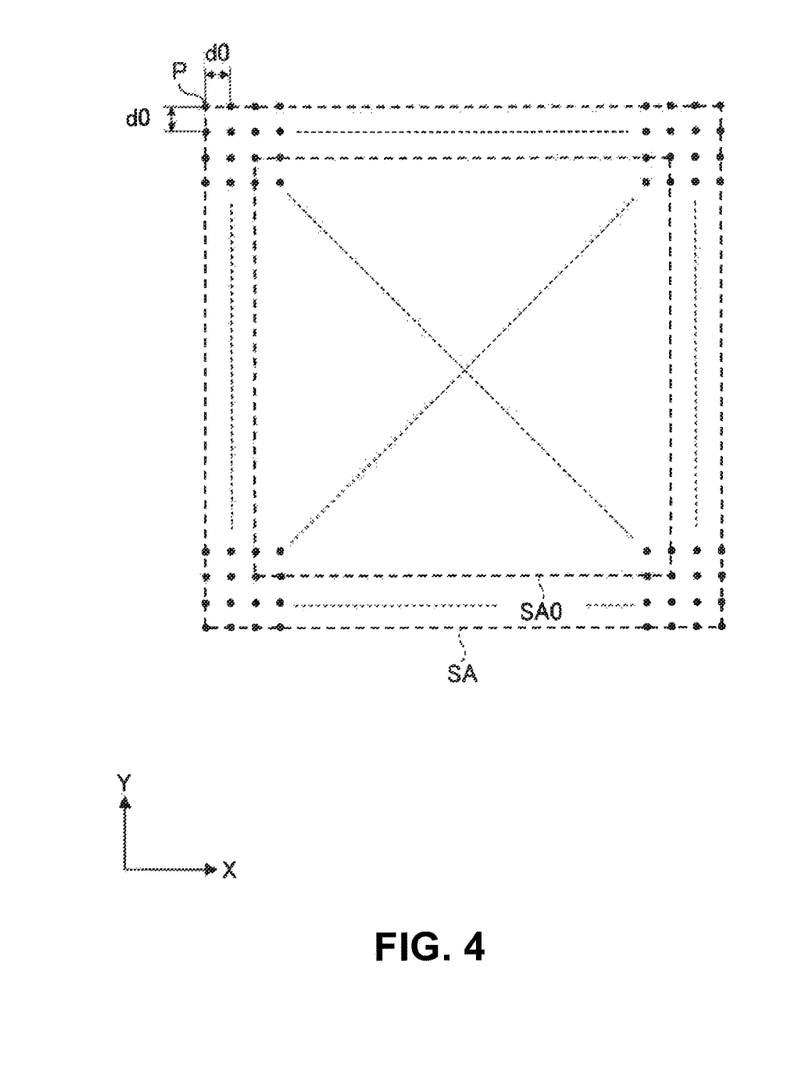
FIG. 4 illustrates arrangement of the candidate points P.

FIG. 4 illustrates arrangement of the candidate points P.

The candidate points P are arranged at predetermined intervals d0 (e.g. d0 is 0.5 m) within the area SA. Some of the candidate points P are arranged outside of the area SA0, while the others are arranged within the area SA0.

The error deriving section (difference summing section) 16 is arranged to sum, for the access points AP1 to AP4 that received the signal, values (errors) based on differences between the distances D1p to D4p between the candidate points P for the position of the radio communication device RD and the access points AP1 to AP4 and the estimated distances D1e to D4e. It is noted that the values (errors) based on the differences are the absolute values of the differences, but may be the n-th powers of the differences ("n" represents an even number equal to or greater than 2). Note here that the error deriving section (difference summing section) 16 is preferably arranged to sum for the wireless access points AP1 to AP4 that received the signal except for that AP3 with the maximum reception strength. AP3 with the maximum reception strength, which has already been used for determining the area SA (error derivation area), is preferably excluded from the summation.

Figure 5:
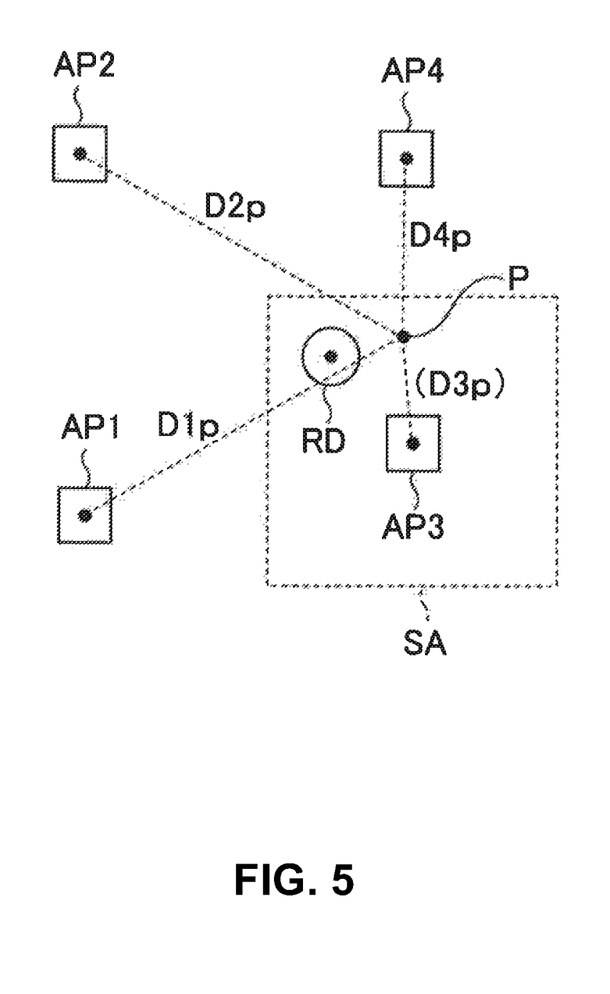
FIG. 5 illustrates the distances D1$p$ to D4$p$ between one of the candidate points P and the access points AP1 to AP4.

FIG. 5 illustrates the distances D1p to D4p between one of the candidate points P and the access points AP1 to AP4.

With reference to FIG. 5, the distance between the candidate point P and the access point AP1 is D1p, the distance between the candidate point P and the access point AP2 is D2p, the distance between the candidate point P and the access point AP3 is D3p, and the distance between the candidate point P and the access point AP4 is D4p. It is noted that the distance D3p is in parentheses because AP3 is excluded from the sum derivation by the error deriving section 16. The candidate point P is arranged within the area SA.

If the candidate point P corresponds to the position of the radio communication device RD, the distances D1p to D4p are equal to the actual distances D1 to D4. Further, if the estimated distances D1e to D4e are equal to the actual distances D1 to D4, the distances D1p to D4p are accordingly equal to the estimated distances D1e to D4e. The values (e.g. absolute values) based on the differences between the distances D1p to D4p and the estimated distances D1e to D4e therefore have 0.

However, if the candidate point P does not correspond to the position of the radio communication device RD and the estimated distances D1e to D4e are not equal to the actual distances D1 to D4, errors occur between the distances D1p to D4p and the estimated distances D1e to D4e. To address this, the differences between the distances D1p to D4p and the estimated distances D1e to D4e are obtained and values (e.g. absolute values) based on the differences are summed as errors for the access points AP1 to AP4 that received the signal.

That is, if the values based on the differences are absolute values, the error deriving section (difference summing section) 16 is arranged to obtain |D1p−D1e|+|D2p−D2e|+|D3p−D3e|+|D4p−D4e| or |D1p−D1e|+|D2p−D2e|+|D4p−D4e| (excluding AP3) as an error. These values are obtained for all of the candidate points P.

However, in order to increase the accuracy of estimation of the position of the radio communication device RD, the error deriving section 16 is preferably arranged to further sum, for the wireless access points AP1 to AP4 that received the signal (preferably excluding AP3 with the maximum reception strength), differences between the distances between surrounding points SP that surround each candidate point P and the wireless access points AP1 to AP4 and the estimated distances D1e to D4e. It is noted that the surrounding points SP will hereinafter be described in "variation" (see FIG. 6) below.

The minimum error candidate point determining section (minimum difference candidate point determining section) 17 is arranged to determine a minimum error candidate point (minimum difference candidate point) with a minimum value as a result of summation by the error deriving section (difference summing section) 16 among the candidate points P. It is noted that the position of the minimum error candidate point (minimum difference candidate point) is estimated as the position of the radio communication device RD.

The candidate points P, which are arranged at the predetermined intervals d0 (e.g. 0.5 m), may not exactly correspond to the position of the radio communication device RD. In addition, the estimated distances D1e to D4e may not be exactly equal to the actual distances D1 to D4.

Hence, the minimum error candidate point with a minimum value as a result of summation by the error deriving section 16 is estimated as the position of the radio communication device RD among the candidate points P.

Next will be described an operation according to the embodiment of the present invention.

Based on a premise, the access points AP0 to AP4 and the radio device RD are arranged as shown in FIG. 1. A signal is transmitted from the radio device RD and received at the access points AP1 to AP4. The access point AP0 is too far from the radio device RD to receive the signal from the radio device RD.

The access points AP1 to AP4 each measure and provide the reception strengths RSSI1 to RSSI4 of the signal transmitted from the radio communication device RD to the position estimation apparatus 1.

The distance estimating section 11 of the position estimation apparatus 1 (see FIG. 2) receives the reception strengths RSSI1 to RSSI4 and estimates actual distances D1 to D4 (see FIG. 1). The estimation is performed using the formula (1) above. Estimated distances D1e to D4e are recorded as a result of the estimation in the estimated distance recording section 12.

The maximum strength detecting section 13 of the position estimation apparatus 1 receives the reception strengths RSSI1 to RSSI4 and provides the access point where the maximum reception strength is measured (AP3 in the example of FIG. 1) to the error derivation area determining section 15.

The error derivation area determining section 15 receives the access point where the maximum reception strength is measured (AP3 in the example of FIG. 1) from the maximum strength detecting section 13 and reads the estimated distance D3e corresponding to AP3 out of the estimated distance recording section 12, while reads the x coordinate and the y coordinate of AP3 (AP3$x$, AP3$y$) out of the access point position recording section 14. The error derivation area determining section 15 further uses the read-out estimated distance D3e and the coordinates of AP3 (AP3$x$, AP3$y$) to determine an area SA (see FIG. 3).

The error deriving section 16 sums, for the access points AP1 to AP4 that received the signal (preferably excluding AP3 with the maximum reception strength), values (errors; e.g. absolute values) based on differences between the distances D1$p$ to D4$p$ (see FIG. 5) between the candidate points P (see FIG. 4) and the access points AP1 to AP4 and the estimated distances D1e to D4e. For example, |D1$p$−D1e|+|D2$p$−D2e|+|D4$p$−D4e| is obtained for all of the candidate points P.

The minimum error candidate point determining section 17 determines a minimum error candidate point with a minimum value as a result of summation by the error deriving section 16 among the candidate points P. It is noted that the position of the minimum error candidate point is estimated as the position of the radio communication device RD.

In accordance with the embodiment of the present invention, the position of the radio device RD can be estimated even if the estimated distances D1e to D4e may be estimated at low accuracy and there may be no point at the estimated distances D1e to D4e from the access points AP1 to AP4. That is, since it is only required to obtain the candidate point P (minimum error candidate point) with a minimum value as a result of summation by the error deriving section 16, the position of the radio device RD can be estimated at increased possibility.

It is noted that the embodiment of the present invention may have a variation in which surrounding points SP are used.

Figure 6:
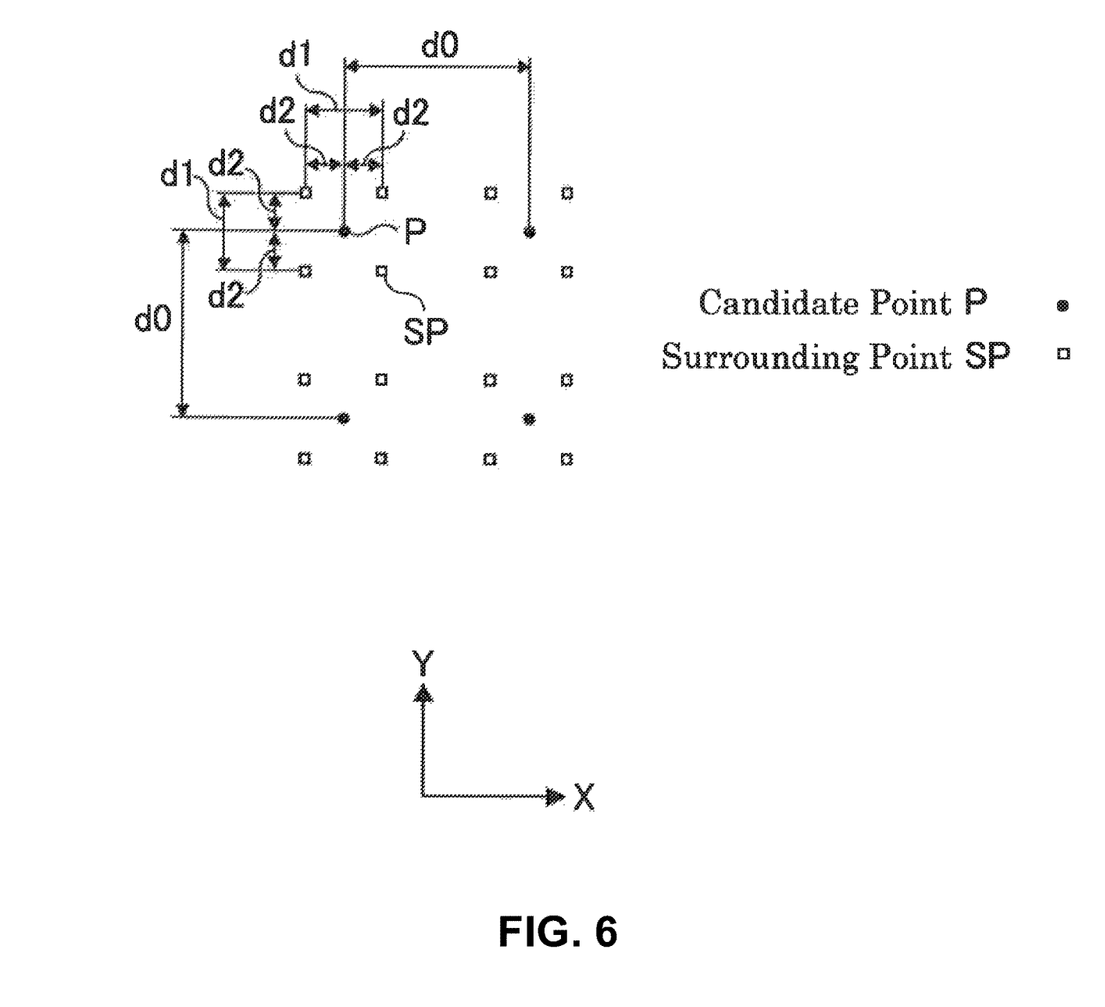
FIG. 6 illustrates arrangement of surrounding points SP according to the variation of the embodiment of the present invention.

FIG. 6 illustrates arrangement of surrounding points SP according to the variation of the embodiment of the present invention.

The surrounding points SP are arranged at intervals d1 (e.g. 0.2 m) smaller than the predetermined intervals d0 (e.g. 0.5 m). It is noted that when each candidate point P has a coordinate (P$x$, P$y$), the surrounding points SP have coordinates SP1 (P$x$+d2, P$y$+d2), SP2 (P$x$+d2, P$y$−d2), SP3 (P$x$−d2, P$y$+d2), SP4 (P$x$−d2, P$y$−d2), where d2=(1/2)×d1.

The error deriving section 16 is further arranged to sum, for the wireless access points AP1 to AP4 that received the signal (preferably excluding AP3 with the maximum reception strength), values (errors) based on differences between the distances between the surrounding points SP (SP1 to SP4) that surround each candidate point P and the access points AP1 to AP4 and the estimated distances D1e to D4e. It is noted that the values (errors) based on the differences are the absolute values of the differences, but may be the n-th powers of the differences ("n" represents an even number equal to or greater than 2).

Here, the distance between the access point AP$i$ and the surrounding point SP$j$ is represented by D$ipj$ (where "i" and "j" each represent an integer of 1 to 4). For example, the distance between the access point AP2 and the surrounding point SP1 is represented by D2$p$1.

Then, if the values based on the differences are absolute values, the error deriving section 16 is arranged to obtain |D1$p$−D1e|+|D2$p$−D2e|+|D4$p$−D4e| and further Σ|D1$pj$−D1e|+Σ|D2$pj$−D2e|+Σ|D3$pj$−D3e|+Σ|D4$pj$−D4e| (where Σ means the sum with the integer "j" varying from 1 to 4) as an error. For example, Σ|D1$pj$−D1e| means |D1$p$1−D1e|+|D1$p$2−D1e|+|D1$p$3−D1e|+|D1$p$4−D1e|.

Accordingly, if the values based on the differences are absolute values, the error deriving section 16 is arranged to obtain |D1$p$−D1e|+|D2$p$−D2e|+|D3$p$−D3e|+|D4$p$−D4e|+Σ|D1$pj$−D1e|+Σ|D2$pj$−D2e|+Σ|D3$pj$−D3e|+Σ|D4$pj$−D4e| as an error.

However, AP3 with the maximum reception strength is preferably excluded and, if the values based on the differences are absolute values, the error deriving section 16 is preferably arranged to obtain |D1$p$−D1e|+|D2$p$−D2e|+|D4$p$−D4e|+Σ|D1$pj$−D1e|+Σ|D2$pj$−D2e|+Σ|D4$pj$−D4e| as an error.

The candidate points P, which are arranged at the predetermined intervals d0 (e.g. 0.5 m), may be displaced from the position of the radio device RD. In this case, if only the candidate points P are subjected to derivation of an error by the error deriving section 16 as in the embodiment of the present invention, the minimum error candidate point may be significantly displaced from the position of the radio device RD. To reduce the possibility of such a displacement, the surrounding points SP are also preferably subjected to derivation of an error by the error deriving section 16 as in the variation.

The above-described embodiment may also be implemented as follows. A computer including a CPU, a hard disk, and a medium (USB memory, CD-ROM, or the like) reading device is caused to read a medium with a program recorded thereon that achieves the above-described components (e.g. the components of the position estimation apparatus 1) and install the program in the hard disk. The above-described features can also be achieved in this manner.

DESCRIPTION OF REFERENCE NUMERAL

1 Position Estimation Apparatus
11 Distance Estimating Section
12 Estimated Distance Recording Section
13 Maximum Strength Detecting Section
14 Access Point Position Recording Section
15 Error Derivation Area Determining Section
16 Error Deriving Section (Difference Summing Section)
17 Minimum Error Candidate Point Determining Section
  (Minimum Difference Candidate Point Determining Section)

| | |
|---|---|
| AP0, AP1, AP2, AP3, AP4 | Wireless LAN Access Point |
| RD | Radio Device (Radio Communication Device) |
| RSSI1 to RSSI4 | Reception Strength |
| D1, D2, D3, D4 | Actual Distance |
| D1e to D4e | Estimated Distance |
| SA | Area (Error Derivation Area) |
| SA0 | Area |
| P | Candidate Point |
| SP | Surrounding Point |
| D1p to D4p | Distances between Candidate Points P and Access Points AP1 to AP4 |
| Dipj | Distance between Access Point APi and Surrounding Point SPj (where "i" and "j" each represent an integer of 1 to 4). |

Figure 7:
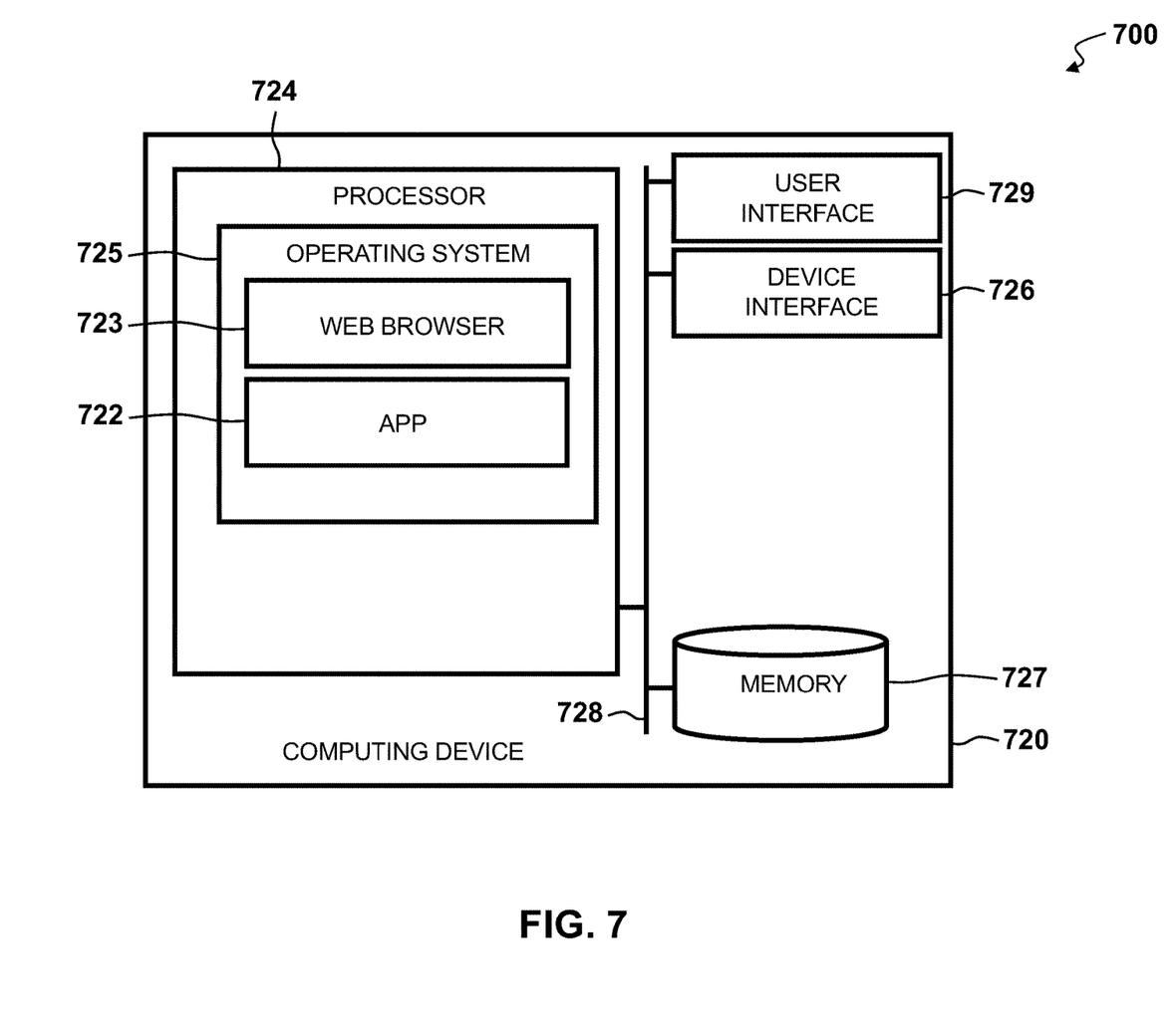
FIG. 7 illustrates an example top-level functional block diagram of a computing device embodiment.

FIG. 7 illustrates an example of a top-level functional block diagram of a computing device embodiment 700. The example operating environment is shown as a computing device 720 comprising a processor 724, such as a central processing unit (CPU), addressable memory 727, an external device interface 726, e.g., an optional universal serial bus port and related processing, and/or an Ethernet port and related processing, and an optional user interface 729, e.g., an array of status lights and one or more toggle switches, and/or a display, and/or a keyboard and/or a pointer-mouse system and/or a touch screen. Optionally, the addressable memory may, for example, be: flash memory, eprom, and/or a disk drive or other hard drive. These elements may be in communication with one another via a data bus 728. In some embodiments, via an operating system 725 such as one supporting a web browser 723 and applications 722, the processor 724 may be configured to execute steps of a process establishing a communication channel and processing according to the embodiments described above.

System embodiments include computing devices such as a server computing device, a buyer computing device, and a seller computing device, each comprising a processor and addressable memory and in electronic communication with each other. The embodiments provide a server computing device that may be configured to: register one or more buyer computing devices and associate each buyer computing device with a buyer profile; register one or more seller computing devices and associate each seller computing device with a seller profile; determine search results of one or more registered buyer computing devices matching one or more buyer criteria via a seller search component. The service computing device may then transmit a message from the registered seller computing device to a registered buyer computing device from the determined search results and provide access to the registered buyer computing device of a property from the one or more properties of the registered seller via a remote access component based on the transmitted message and the associated buyer computing device; and track movement of the registered buyer computing device in the accessed property via a viewer tracking component. Accordingly, the system may facilitate the tracking of buyers by the system and sellers once they are on the property and aid in the seller's search for finding buyers for their property. The figures described below provide more details about the implementation of the devices and how they may interact with each other using the disclosed technology.

Figure 8:
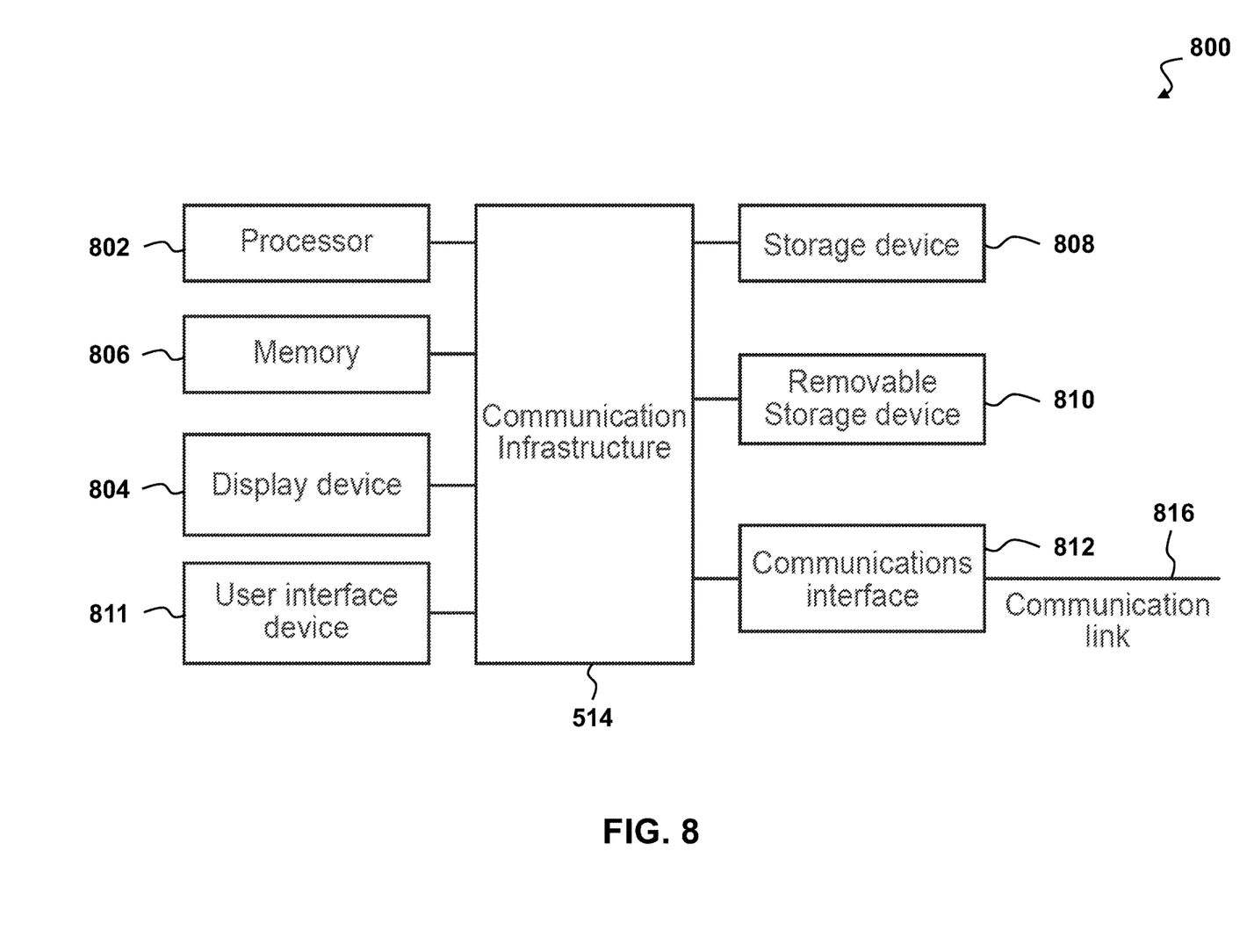
FIG. 8 shows a high-level block diagram and process of a computing system for implementing an embodiment of the system and process.

FIG. 8 is a high-level block diagram 800 showing a computing system comprising a computer system useful for implementing an embodiment of the system and process, disclosed herein. Embodiments of the system may be implemented in different computing environments. The computer system includes one or more processors 802, and can further include an electronic display device 804 (e.g., for displaying graphics, text, and other data), a main memory 806 (e.g., random access memory (RAM)), storage device 808, a removable storage device 810 (e.g., removable storage drive, a removable memory module, a magnetic tape drive, an optical disk drive, a computer readable medium having stored therein computer software and/or data), user interface device 811 (e.g., keyboard, touch screen, keypad, pointing device), and a communication interface 812 (e.g., modem, a network interface (such as an Ethernet card), a communications port, or a PCMCIA slot and card). The communication interface 812 allows software and data to be transferred between the computer system and external devices. The system further includes a communications infrastructure 814 (e.g., a communications bus, cross-over bar, or network) to which the aforementioned devices/modules are connected as shown.

Information transferred via communications interface 814 may be in the form of signals such as electronic, electromagnetic, optical, or other signals capable of being received by communications interface 814, via a communication link 816 that carries signals and may be implemented using wire or cable, fiber optics, a phone line, a cellular/mobile phone link, an radio frequency (RF) link, and/or other communication channels. Computer program instructions representing the block diagram and/or flowcharts herein may be loaded onto a computer, programmable data processing apparatus, or processing devices to cause a series of operations performed thereon to produce a computer implemented process.

Embodiments have been described with reference to flowchart illustrations and/or block diagrams of methods, apparatus (systems) and computer program products according to embodiments. Each block of such illustrations/diagrams, or combinations thereof, can be implemented by computer program instructions. The computer program instructions when provided to a processor produce a machine, such that the instructions, which execute via the processor, create means for implementing the functions/operations specified in the flowchart and/or block diagram. Each block in the flowchart/block diagrams may represent a hardware and/or software module or logic, implementing embodiments. In alternative implementations, the functions noted in the blocks may occur out of the order noted in the figures, concurrently, etc.

Computer programs (i.e., computer control logic) are stored in main memory and/or secondary memory. Computer programs may also be received via a communications interface 812. Such computer programs, when executed, enable the computer system to perform the features of the embodiments as discussed herein. In particular, the computer programs, when executed, enable the processor and/or multi-core processor to perform the features of the computer system. Such computer programs represent controllers of the computer system.

Figure 9:
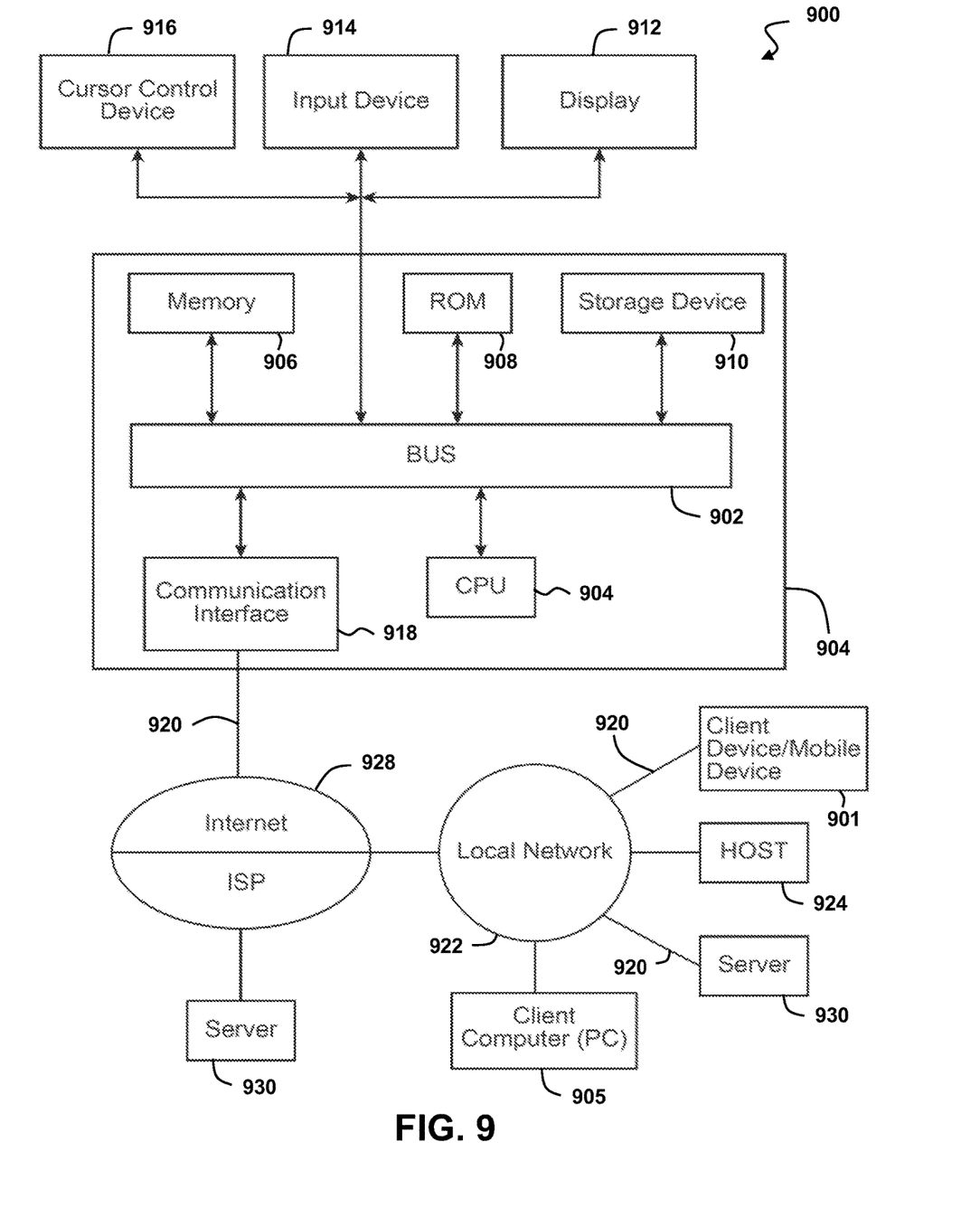
FIG. 9 shows a block diagram and process of an exemplary system in which an embodiment may be implemented.

FIG. 9 shows a block diagram of an example system 900 in which an embodiment may be implemented. The system 900 includes one or more client devices 901 such as consumer electronics devices, connected to one or more server computing systems 930. A server 930 includes a bus 902 or other communication mechanism for communicating information, and a processor (CPU) 904 coupled with the bus 902 for processing information. The server 930 also includes a main memory 906, such as a random access memory (RAM) or other dynamic storage device, coupled to the bus 902 for storing information and instructions to be executed by the processor 904. The main memory 906 also may be used for storing temporary variables or other intermediate information during execution or instructions to be executed by the processor 904. The server computer system 930 further includes a read only memory (ROM) 908 or other static storage device coupled to the bus 902 for storing static information and instructions for the processor 904. A storage device 910, such as a magnetic disk or optical disk, is provided and coupled to the bus 902 for storing information and instructions. The bus 902 may contain, for example, thirty-two address lines for addressing video memory or main memory 906. The bus 902 can also include, for example, a 32-bit data bus for transferring data between and among the components, such as the CPU 904, the main memory 906, video memory and the storage 910. Alternatively, multiplex data/address lines may be used instead of separate data and address lines.

The server 930 may be coupled via the bus 902 to a display 912 for displaying information to a computer user. An input device 914, including alphanumeric and other keys, is coupled to the bus 902 for communicating information and command selections to the processor 904. Another type or user input device comprises cursor control 916, such as a mouse, a trackball, or cursor direction keys for communicating direction information and command selections to the processor 904 and for controlling cursor movement on the display 912.

According to one embodiment, the functions are performed by the processor 904 executing one or more sequences of one or more instructions contained in the main memory 906. Such instructions may be read into the main memory 906 from another computer-readable medium, such as the storage device 910. Execution of the sequences of instructions contained in the main memory 906 causes the processor 904 to perform the process steps described herein. One or more processors in a multi-processing arrangement may also be employed to execute the sequences of instructions contained in the main memory 906. In alternative embodiments, hard-wired circuitry may be used in place of or in combination with software instructions to implement the embodiments. Thus, embodiments are not limited to any specific combination of hardware circuitry and software.

The terms "computer program medium," "computer usable medium," "computer readable medium", and "computer program product," are used to generally refer to media such as main memory, secondary memory, removable storage drive, a hard disk installed in hard disk drive, and signals. These computer program products are means for providing software to the computer system. The computer readable medium allows the computer system to read data, instructions, messages or message packets, and other computer readable information from the computer readable medium. The computer readable medium, for example, may include non-volatile memory, such as a floppy disk, ROM, flash memory, disk drive memory, a CD-ROM, and other permanent storage. It is useful, for example, for transporting information, such as data and computer instructions, between computer systems. Furthermore, the computer readable medium may comprise computer readable information in a transitory state medium such as a network link and/or a network interface, including a wired network or a wireless network that allow a computer to read such computer readable information. Computer programs (also called computer control logic) are stored in main memory and/or secondary memory. Computer programs may also be received via a communications interface. Such computer programs, when executed, enable the computer system to perform the features of the embodiments as discussed herein. In particular, the computer programs, when executed, enable the processor multi-core processor to perform the features of the computer system. Accordingly, such computer programs represent controllers of the computer system.

Generally, the term "computer-readable medium" as used herein refers to any medium that participated in providing instructions to the processor 904 for execution. Such a medium may take many forms, including but not limited to, non-volatile media, volatile media, and transmission media. Non-volatile media includes, for example, optical or magnetic disks, such as the storage device 910. Volatile media includes dynamic memory, such as the main memory 906. Transmission media includes coaxial cables, copper wire and fiber optics, including the wires that comprise the bus 902. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, an EPROM, a FLASH-EPROM, any other memory chip or cartridge, a carrier wave as described hereinafter, or any other medium from which a computer can read.

Various forms of computer readable media may be involved in carrying one or more sequences of one or more instructions to the processor 904 for execution. For example, the instructions may initially be carried on a magnetic disk of a remote computer. The remote computer can load the instructions into its dynamic memory and send the instructions over a telephone line using a modem. A modem local to the server 930 can receive the data on the telephone line and use an infrared transmitter to convert the data to an infrared signal. An infrared detector coupled to the bus 902 can receive the data carried in the infrared signal and place the data on the bus 902. The bus 902 carries the data to the main memory 906, from which the processor 904 retrieves and executes the instructions. The instructions received from the main memory 906 may optionally be stored on the storage device 910 either before or after execution by the processor 904.

The server 930 also includes a communication interface 918 coupled to the bus 902. The communication interface 918 provides a two-way data communication coupling to a network link 920 that is connected to the world wide packet data communication network now commonly referred to as the Internet 928. The Internet 928 uses electrical, electromagnetic or optical signals that carry digital data streams. The signals through the various networks and the signals on the network link 920 and through the communication interface 918, which carry the digital data to and from the server 930, are exemplary forms or carrier waves transporting the information.

In another embodiment of the server 930, interface 918 is connected to a network 922 via a communication link 920. For example, the communication interface 918 may be an integrated services digital network (ISDN) card or a modem to provide a data communication connection to a corresponding type of telephone line, which can comprise part of the network link 920. As another example, the communication interface 918 may be a local area network (LAN) card to provide a data communication connection to a compatible LAN. Wireless links may also be implemented. In any such implementation, the communication interface 918 sends and receives electrical electromagnetic or optical signals that carry digital data streams representing various types of information.

The network link 920 typically provides data communication through one or more networks to other data devices. For example, the network link 920 may provide a connection through the local network 922 to a host computer 924 or to data equipment operated by an Internet Service Provider (ISP). The ISP in turn provides data communication services through the Internet 928. The local network 922 and the Internet 928 both use electrical, electromagnetic or optical signals that carry digital data streams. The signals through the various networks and the signals on the network link 920 and through the communication interface 918, which carry the digital data to and from the server 930, are exemplary forms or carrier waves transporting the information.

The server 930 can send/receive messages and data, including e-mail, program code, through the network, the network link 920 and the communication interface 918. Further, the communication interface 918 can comprise a USB/Tuner and the network link 920 may be an antenna or cable for connecting the server 930 to a cable provider, satellite provider or other terrestrial transmission system for receiving messages, data and program code from another source.

The example versions of the embodiments described herein may be implemented as logical operations in a distributed processing system such as the system 900 including the servers 930. The logical operations of the embodiments may be implemented as a sequence of steps executing in the server 930, and as interconnected machine modules within the system 900. The implementation is a matter of choice and can depend on performance of the system 900 implementing the embodiments. As such, the logical operations constituting said example versions of the embodiments are referred to for e.g., as operations, steps or modules.

Similar to a server 930 described above, a client device 901 can include a processor, memory, storage device, display, input device and communication interface (e.g., e-mail interface) for connecting the client device to the Internet 928, the ISP, or LAN 922, for communication with the servers 930.

The system 900 can further include computers (e.g., personal computers, computing nodes) 905 operating in the same manner as client devices 901, where a user can utilize one or more computers 905 to manage data in the server 930.

Figure 10:
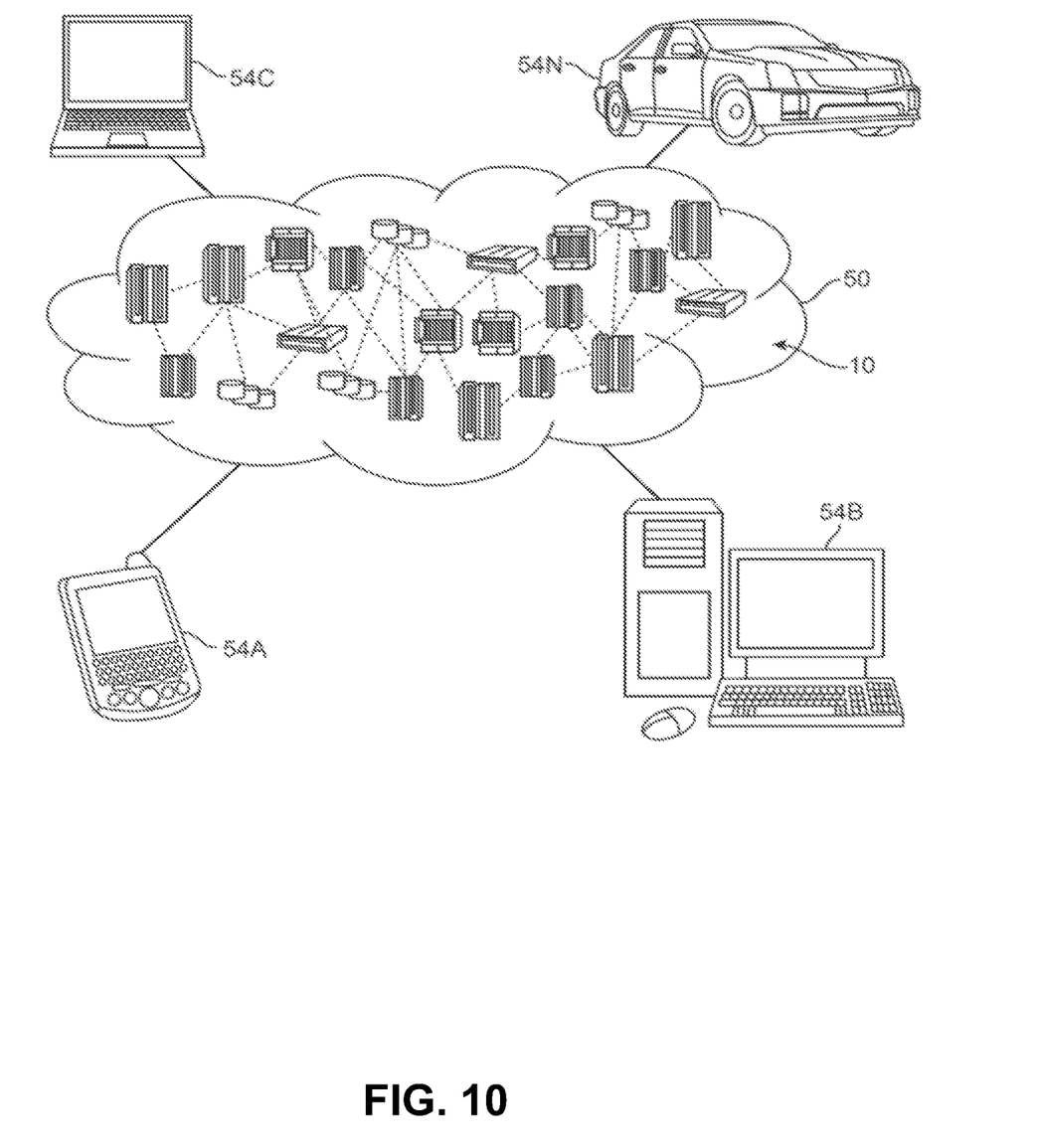
FIG. 10 depicts a cloud computing environment for implementing an embodiment of the system and process disclosed herein.

Referring now to FIG. 10, illustrative cloud computing environment 50 is depicted. As shown, cloud computing environment 50 comprises one or more cloud computing nodes 10 with which local computing devices used by cloud consumers, such as, for example, personal digital assistant (PDA), smartphone, smart watch, set-top box, video game system, tablet, mobile computing device, or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 10 are intended to be illustrative only and that computing nodes 10 and cloud computing environment 50 can communicate with any type of computerized device over any type of network and/or network addressable connection (e.g., using a web browser).

It is contemplated that various combinations and/or subcombinations of the specific features and aspects of the above embodiments may be made and still fall within the scope of the invention. Accordingly, it should be understood that various features and aspects of the disclosed embodiments may be combined with or substituted for one another in order to form varying modes of the disclosed invention. Further, it is intended that the scope of the present invention is herein disclosed by way of examples and should not be limited by the particular disclosed embodiments described above.

What is claimed is:

1. A position estimation apparatus for estimation of the position of a radio communication device that outputs a signal, the apparatus comprising:
 a distance estimating section that estimates actual distances between wireless access points that receive the signal and the radio communication device as estimated distances based on the reception strength of the signal;
 a difference summing section that sums, for the wireless access points that received the signal, values based on differences between the distances between candidate points for the position of the radio communication device and the wireless access points and the estimated distances, wherein the difference summing section is arranged to sum for the wireless access points that received the signal except for that with the maximum reception strength; and
 a minimum difference candidate point determining section that determines a minimum difference candidate point with a minimum value as a result of summation by the difference summing section among the candidate points, wherein the position of the minimum difference candidate point is estimated as the position of the radio communication device, and the candidate points exist within the area of a square that is circumscribed around a circle centered at one of the wireless access points with the maximum reception strength and having one of the estimated distances estimated for the center of the circle as a radius.

2. The position estimation apparatus according to claim 1, wherein the candidate points are arranged at predetermined intervals.

3. A position estimation apparatus for estimation of the position of a radio communication device that outputs a signal, the apparatus comprising:

a distance estimating section that estimates actual distances between wireless access points that receive the signal and the radio communication device as estimated distances based on the reception strength of the signal;

a difference summing section that sums, for the wireless access points that received the signal, values based on differences between the distances between candidate points for the position of the radio communication device and the wireless access points and the estimated distances, wherein the difference summing section is further arranged to sum, for the wireless access points that received the signal, values based on differences between the distances between surrounding points that surround the candidate points and the wireless access points and the estimated distances; and a minimum difference candidate point determining section that determines a minimum difference candidate point with a minimum value as a result of summation by the difference summing section among the candidate points, wherein the position of the minimum difference candidate point is estimated as the position of the radio communication device, and the candidate points exist within the area of a square that is circumscribed around a circle centered at one of the wireless access points with the maximum reception strength and having one of the estimated distances estimated for the center of the circle as a radius.

4. The position estimation apparatus according to claim 3, wherein the candidate points are arranged at predetermined intervals, and the surrounding points are arranged at intervals smaller than the predetermined intervals.

5. A position estimation apparatus for estimation of the position of a radio communication device that outputs a signal, the apparatus comprising:

a distance estimating section that estimates actual distances between wireless access points that receive the signal and the radio communication device as estimated distances based on the reception strength of the signal;

a difference summing section that sums, for the wireless access points that received the signal, values based on differences between the distances between candidate points for the position of the radio communication device and the wireless access points and the estimated distances; and a minimum difference candidate point determining section that determines a minimum difference candidate point with a minimum value as a result of summation by the difference summing section among the candidate points, wherein the position of the minimum difference candidate point is estimated as the position of the radio communication device, and the candidate points exist within the area of a square that is circumscribed around a circle centered at one of the wireless access points with the maximum reception strength and having one of the estimated distances estimated for the center of the circle as a radius, wherein the candidate points exist within an area with the vertical sides and the horizontal sides of the square each extended by an error predicted between the estimated distances and the actual distances.

6. The position estimation apparatus according to claim 1, wherein the candidate points exist within an area with the vertical sides and the horizontal sides of the square each extended by 2 meters.

\* \* \* \* \*